(No Model.) 2 Sheets—Sheet 1.
C. WOOLLEY.
PNEUMATIC TIRE.
No. 546,968. Patented Sept. 24, 1895.
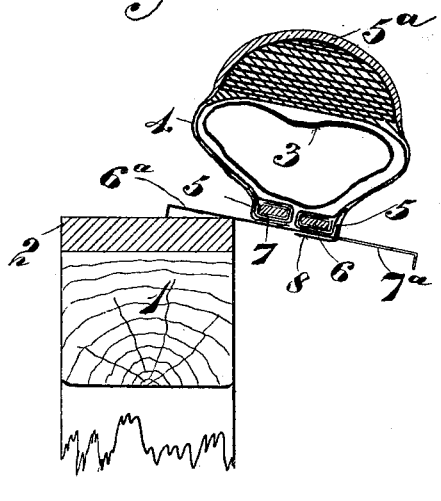
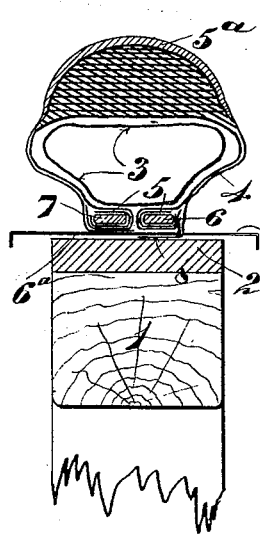
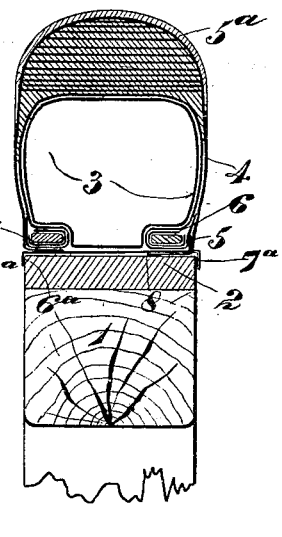
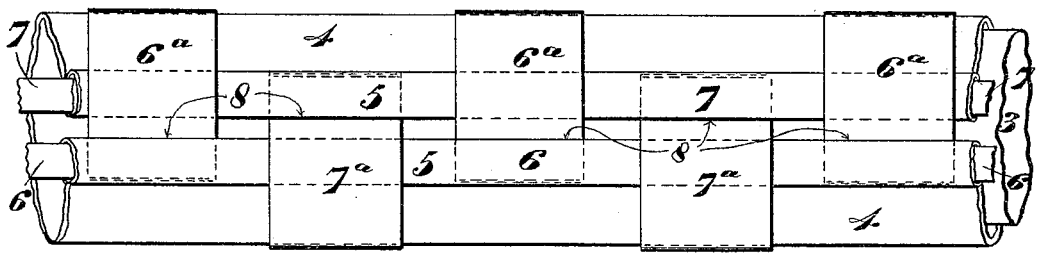
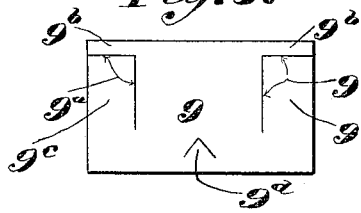
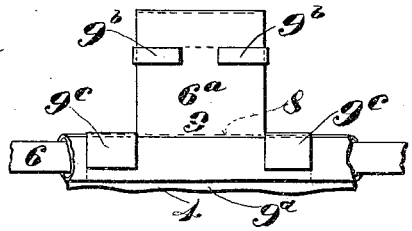
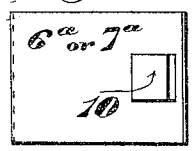
Witnesses.
F. W. Holt
G. V. Chandler
Inventor:
Charles Woolley
By Patterson & Nesbit
attys.

(No Model.) 2 Sheets—Sheet 2.
C. WOOLLEY.
PNEUMATIC TIRE.
No. 546,968. Patented Sept. 24, 1895.
Fig. 9.
Fig. 10.
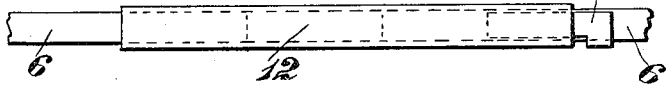
Fig. 11.
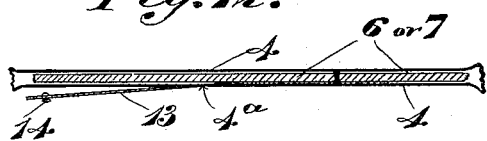
Fig. 12.
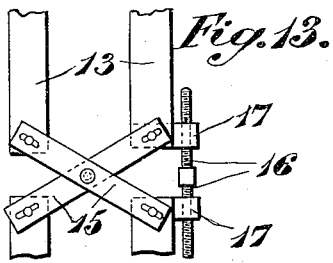
Fig. 13.
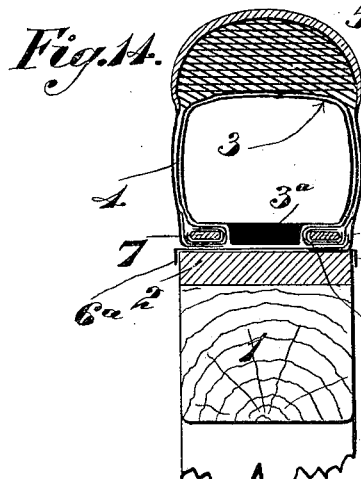
Fig. 14.
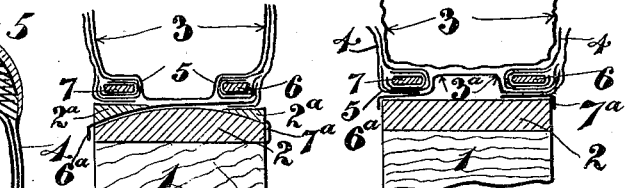
Fig. 13a.   Fig. 15a.
Fig. 15.
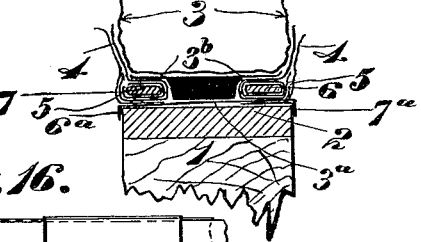
Fig. 16.
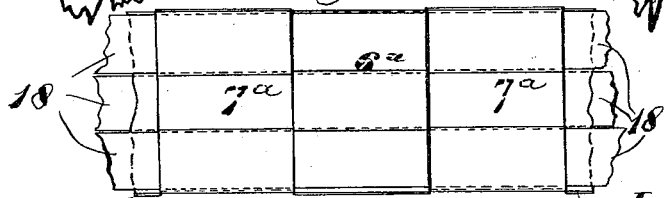
Fig. 17.
Witnesses
F. W. Holt
G. V. Chandler
Inventor
Charles Woolley
By Pattison & Nash
attys

UNITED STATES PATENT OFFICE.

CHARLES WOOLLEY, OF LONDON, ENGLAND.

PNEUMATIC TIRE.

SPECIFICATION forming part of Letters Patent No. 546,968, dated September 24, 1895.

Application filed December 19, 1894. Serial No. 532,367. (No model.) Patented in France November 22, 1894, No. 243,060.

*To all whom it may concern:*

Be it known that I, CHARLES WOOLLEY, a subject of the Queen of Great Britain and Ireland, residing at Brixton, in the city of London, England, have invented Improvements in and Relating to Pneumatic Tires, (for which a patent has been granted in France, bearing No. 243,060, dated November 22, 1894,) of which the following is a specification.

This invention relates to the application of pneumatic tires of the wired-on variety to the wheels of ordinary road vehicles in such a way as to obviate the necessity of making any alteration to the wheels except, perhaps, to drill the valve-holes, so that not only is all expense in altering the wheels saved, but the wheels remain equally serviceable either with the tires or without them, whereby the risk of any serious inconvenience resulting through any failure of the tires is avoided, the construction of the tires being such as to admit of their being readily removed from the wheels and replaced upon them when desired. For this purpose there are attached to the wires in the edges of the outer cover of the pneumatic tire alternately on each side strong metal hooks or angle-pieces, (hereinafter referred to as "angle-pieces,") arranged to cross beneath the said tire, the arrangement being such that when the tire is placed upon the wheel and inflated the angle-pieces will be automatically caused to grip the edges of the iron tire on the wheel on the side opposite to that on which the wire to which each angle-piece is attached lies. The angle-pieces may be arranged continuously around the tire alternately on each side or at short intervals, and they may be hooked or angled at one end only or at both ends on reverse sides, the one end in the latter case being designed to grip the corresponding wire and the other end the edge of the wheel. Also, instead of being attached to the tire-cover, the said angle-pieces may be made into a separate band independently of the tire-cover. The wires if endless should be of such circumferential length as to cause the cover of the tire with the angle-pieces beneath it to just fit around the wheel, and if the length of the wires is variable, so as to admit of the cover being adapted to wheels of slightly-varying sizes, it should admit of being thus adjusted to suit the size of the wheel to which the tire is to be applied.

In the accompanying drawings, Figures 1, 2, and 3 are cross-sections showing a tire provided with fastening devices according to this invention, Fig. 1 showing the manner of placing the tire on the wheel, Fig. 2 showing it in position on the wheel ready to be inflated, and Fig. 3 showing it inflated and thereby secured on the wheel. Fig. 4 is a part plan of the pneumatic tire alone, showing the inner portion thereof with some of the angle-pieces attached thereto. Fig. 5 is a plan showing a metallic plate that may be employed to protect an exposed edge of the tire-cover, as hereinafter explained, and Fig. 6 is a plan showing the application of such a plate. Figs. 7 and 8 show in plan and side elevation, respectively, and Fig. 9 in cross-section, modified ways of securing the angle-pieces to the rings. Figs. 10, 11, 12, and 13 illustrate two methods of connecting the ends of wires that do not form endless rings. Figs. 13$^a$, 14, 15, and 15$^a$ are similar views to Fig. 3, showing modified constructions. Fig. 16 is a plan, and Fig. 17 a cross-section, illustrating a method of securing the angle-pieces together when not fastened to the tire-cover.

Referring to Figs. 1 to 4, inclusive, 1 is the wooden felly, and 2 the plain metal tire, of a wheel such as is commonly used for road vehicles other than cycles.

The pneumatic tire, which may be built up in various ways, as well understood, consists, essentially, of an inner air-tube 3 and an outer cover 4, having tubular edges 5, in which are secured, in this example, endless metal wires or rings 6 and 7, which may advantageously be made of oval or flattened form in cross-section, as shown, in order to increase their strength in a lateral direction. For the purpose of securing such a tire on the wheel it is provided with two sets of alternately-arranged angle-pieces 6$^a$ and 7$^a$, attached respectively to the rings 6 and 7, which are of such a diameter as to fit closely over the angle-pieces when these are in position on the wheel. By this construction when the tire is placed upon a wheel-rim and inflated the rings 6 and 7 will be moved apart, and thereby automatically bring the outer free ends of the hooks attached thereto into close contact with the opposite sides or edges of the wheel-tire 2. The said rings will then firmly hold the angle-pieces on the plain outer periphery of the wheel and thereby effectually secure the pneumatic tire in place thereon. Each of the hooks 6ª and 7ª shown consists of a piece of plain sheet metal, preferably steel, having its free end bent approximately at right angles to the body portion, so as to form an angle or hook adapted to bear against or engage with one side of a wheel. The radially outwardly-projecting portions of the angle-pieces 6ª and 7ª are preferably arranged, as shown, so as not to project radially outward beyond the rings 6 and 7 and the parts of the tubular edges 5, that cover the said rings, so that even if the tire be used when deflated the said projecting portions will not be liable to injure the air-tube nor to be themselves injured. Such angle-pieces can be attached to the rings 6 and 7 in various ways. Thus in Figs. 1 to 4, inclusive, where the angle-pieces are shown bent or angled at each end on reverse sides, one of such ends is arranged between and cemented to the two layers of canvas or other material at that edge of the tire-cover to which it is to be secured, so that the upturned fixed end of the angle-piece bears against the outer side of the corresponding ring, as shown. In this case, in order to protect the exposed edge 8 of the outer of the two layers, it may be covered where it overlaps an angle-piece with a thin metallic plate 9, Figs. 5 and 6, which is slit at 9ª, Fig. 5, in such a way that when applied to one of the angle-pieces the portions 9ᵇ can be turned over upon the side of the angle-piece next the tire, and the portion 9ᶜ can be turned inward and partly around the corresponding covered ring 6 or 7, Fig. 6, an angle-piece or projection 9ᵈ on the plate being hooked into the edge of the tire-cover, so as to secure it in place on the hook to which it is applied, or each angle-piece may have a piece 10 punched partly out of it, as shown in Figs. 7 and 8, such piece being bent to the shape shown in the latter figure, so as to admit of the angle-piece being easily slipped over one of the wire rings, as shown in Fig. 8. To prevent the angle-pieces in this case becoming detached when the tire is off the wheel, strips of thin canvas may be cemented along the edges of the tire over the ends of the angle-pieces before the tire is completed, or each angle-piece may be directly fastened near one end to one of the wire rings—as, for example, by a rivet 11, as shown in Fig. 9—in which case the said end may be plain—that is, not bent, as it is in the other examples.

To secure a pneumatic tire provided with angle-pieces, such as hereinbefore described, upon a wheel, the rings 6 and 7 are pressed close together all around except near the air-valve and the valve inserted in the valve-hole in the wheel. Then commencing from the valve in both directions the tire is laid around the wheel as far as this can be conveniently done, after which the remaining angle-pieces next the wheel are slightly bent, so as to get their points upon the periphery of the wheel, as shown in Fig. 1. The two rings 6 and 7 being still kept close together, the tire can then be easily pushed entirely onto the wheel, its parts then occupying the positions shown in Fig. 2. Upon then inflating the tire the said rings will be moved apart and the free ends of the two series of angle-pieces 6ª 7ª caused to automatically grip the opposite sides of the wheel, as shown in Fig. 3, and hold the tire immovably upon it. To detach the tire it is first deflated and the ring 6 or 7 on one side pressed to the opposite side, so as to release the ends of the corresponding set of angle-pieces, some of which can then be lifted or sprung over the edge of the wheel. When about a third of them have thus been released, the tire can be pulled off the wheel.

In order that tires provided with fastenings of the kind hereinbefore described may be applicable to wheels of slightly-differing diameters, and in order, also, that the rings 6 and 7 may be caused not only to hold the angle-pieces 6ª and 7ª in place on the wheel, but also to clamp them tightly on the said wheel, it is advantageous to make the thread 5ª practically inextensible in length, and to make the rings contractile in diameter, so that the air-tube 3 when inflated will exert a considerable inward pressure on the rings 6 and 7, and thus contract them in diameter and bind them on the angle-pieces. The inextensible thread may be formed in various ways, one of which is by building it up, as shown, of alternate layers of canvas and rubber cemented together. To make the rings contractile in diameter the wires 6 and 7 may be made discontinuous and be provided with means for adjusting the diameter of the rings formed by them. Figs. 10 and 11 show an arrangement for this purpose, in which the ends of the wire 6 or 7 fit in a flattened sleeve or tube 12, one of the ends being soldered or otherwise permanently fastened therein and the other being secured therein by means of a wedge 12ª when the ring has been adjusted to the required diameter, the wedge being inserted through a slit in the edge of the tire-cover before inflation of the tire and tightened up after the rings have been duly contracted in diameter. In such an arrangement each wire 6 and 7 may, if desired, be made in two or more lengths, connected together by sliding or telescopic joints, such as described.

In the modified arrangement shown in Figs. 12 and 13 the ends of the strips 6 and 7 are each connected to a strip 13 of metal that passes through a slit at 4ª in the edge of the tire-cover 4 and carries a pin 14, the four pins working in slots in the ends of a pair of pivoted levers 15. The ends of the strips thus connected can be moved toward or from each other when applying and detaching the tire, respectively, by a right and left handed screw 16, engaging in lugs 17, projecting from the ends of the strips that will be next the inner side of the wheel when in use, so that they will not be liable to be easily damaged or to cause damage. When coupling devices are thus used, if the hooks are not riveted to the wire rings, the tire-cover will not be creased or strained at the points where the coupling devices are located when the rings are contracted or increased in diameter.

When a tire having endless rings 6 and 7 is to be applied to a wheel having a periphery of convex form in cross-section, strips $2^a$ of suitable hard material, such as hard rubber or gutta-percha and of wedge shape in cross-section, may be forced in between the edges of the base of the tire and the wheel and over the free ends of the hooks, as shown in Fig. $13^a$. The angle-pieces may in this case be made of a curved form to suit the convexity of the wheel.

The under side or inner periphery of pneumatic tires, constructed as hereinbefore described, may be either open all around, as in the examples hereinbefore described, or closed. In the latter case its breadth must be such that it will not on the tire being inflated hinder the wires or rings 6 and 7 spreading apart until all the spreading force of the compressed air is borne by the angle-pieces acting on the sides of the wheel.

In order that the pneumatic tire may remain in position on the wheel even after accidental deflation, the air-tube 3 may be provided with a thickened base $3^a$, Fig. 14, of a width equal or approximately equal to the distance between the covered rings 6 and 7 when in the postions shown in Fig. 3, so that when the tire is inflated and the rings moved apart the said base will be forced between the rings and keep them apart. To remove the tire, it will be then necessary to first force inward the base $3^a$. This may be effected by pressing outward the air-valve, so as to remove the said base (through which it extends) from between the rings at this point, and then commencing at each side of the air-valve to press the said rings together, to facilitate which the base $3^a$ is preferably slightly beveled; or the thickened base or part $3^a$ may, as I prefer, be secured to the outer side of a strip of canvas $3^b$, cemented to the inner surface of one of the tubular edges 5 of the tire-cover 4, as shown in Fig. 15. When extensible rings 6 and 7 are used, the angle-pieces $6^a$ $7^a$ may be each formed or provided with a raised central part $3^a$, as shown in Fig. $15^a$, that is adapted to enter between the rings when these are moved apart.

Instead of attaching the angle-pieces $6^a$ and $7^a$ to the edges of the cover 4, they may, as hereinbefore stated, be made into a separate band independent of the tire-cover. In this case they may conveniently be strung together, as shown in Figs. 16 and 17, where they are shown as threaded into an endless band formed of three tapes or strips 18 of canvas, with which the angle-pieces are interlaced, as shown. In this construction the angle-pieces, which are hooked or angled at each end on reverse sides, need not extend outwardly alternately in opposite directions, as in Figs. 1 and 2, but are preferably placed with the hooked or angled ends on either side practically in line with each other, as shown in Fig. 17, and the whole covered or inclosed in a casing or covering 19, of suitable flexible material, such as canvas. By stitching the inner and outer portions of canvas together between the angle-pieces the tapes 18 may be dispensed with. When such a band of angle-pieces is to be applied to a wheel-rim that has been worn to a rounded form, the canvas casing or cover 19 may be provided with a thickened or filling piece 20 at each side on the inner or outer portion of the casing or cover 19—that is, at the inner periphery of the band of angle-pieces—as indicated in dotted lines in Fig. 17, so as to compensate for the portion of the wheel-rim that has been worn away and leave a surface that is straight in cross-section for the hooks to rest upon. The angle-pieces may be placed close together, as shown, or be separated by distance-pieces secured to one of the tapes to keep them in place. In using such a band of angle-pieces the band is first placed around the wheel and the pneumatic tire placed partly around it, then a portion of the band is drawn to one side to enable the tire to be placed completely around the band, after which the displaced portion with tire is forced back over the wheel. The tire is then inflated, the wires or rings in the edges of the tire-cover, which are then located in the trough-like channel formed by the outwardly-extending bent ends of the angle-pieces, acting laterally in opposite directions against the said ends, so as to cause the other ends of the angle-pieces to bear tightly against the sides of the wheel, and so hold the tire firmly in place.

As will be obvious, I do not limit myself to the form and dimensions of the angle-pieces used, provided they are adapted to engage the sides of the wheel and are held around the periphery thereof when the tire is inflated by wires in the edges of the tire-cover.

What I claim is—

1. For securing a pneumatic tire on a wheel, the combination with two wires or rings carried by the tire cover, of two sets of hooks adapted to engage the exterior of the wheel at opposite sides thereof and to be pressed tightly thereagainst by the said wires or rings on the inflation of the tire, substantially as set forth.

2. For securing a pneumatic tire on a wheel, a device comprising two wires or rings carried by the tire-cover and two sets of angle pieces adapted to engage the exterior of the wheel at opposite sides thereof and on the inflation of the tire to be pressed tightly thereagainst and to be thereby locked in their fastening-position by the said wires or rings, substantially as set forth.

3. For securing a pneumatic tire on a vehicle wheel the combination with the tire, of two wires or rings carried by the tire-cover, two sets of angle pieces adapted to engage the exterior of the wheel at opposite sides thereof and to be pressed tightly thereagainst by the said wires or rings on the inflation of the tire, and a distance piece adapted to enter between the said wires or rings when the tire is inflated and thus to lock them in position, substantially as set forth.

4. A device for securing pneumatic tires on the wheels of vehicles, comprising two wires or rings secured to the tire-cover and two sets of angle pieces adapted to engage the exterior of the wheel at the opposite sides thereof and to be pressed tightly thereagainst by the said wires or strips on the inflation of the tire, each of said angle pieces being angled at both ends, one end being adapted to engage with one of the said wires or strips and the other with the exterior of the wheel, substantially as set forth.

5. The combination with a vehicle-wheel not specially modified for the purpose, of a pneumatic tire, two wires or rings secured to the said tire, and two series of angle pieces adapted to engage the exterior of the wheel at opposite sides thereof and to be pressed tightly thereagainst by the said wires or rings on the inflation of the tire, substantially as set forth.

6. For securing a pneumatic tire on a wheel, a band of angle pieces adapted to fit around and engage with a wheel and to receive and hold a pneumatic tire, said band of angle pieces consisting of two sets of plates flexibly connected together and adapted to engage with the exterior of the wheel on opposite sides thereof, each of the said plates being bent or angled at both ends, one end being adapted to engage with the tire and the other with the exterior of the wheel.

7. For securing a pneumatic tire on a wheel, a band of angle pieces adapted to fit around and engage with a wheel and to receive and hold a pneumatic tire, said band of angle pieces consisting of two sets of plates adapted to engage with the exterior of the wheel on opposite sides thereof, and endless tapes with which the said plates are interlaced, each of the said plates being bent or angled at both ends, one end being adapted to engage with the tire and the other end with the exterior of the wheel, substantially as described.

8. For securing a pneumatic tire on a wheel rim, a band of angle pieces adapted to fit around and engage with a wheel rim and to receive and hold a pneumatic tire, said band of angle pieces consisting of a series of plates bent or angled at each end in reverse directions and an outer flexible casing or cover in which said angle pieces are inclosed.

9. For securing a pneumatic tire on a wheel rim, a band of angle pieces adapted to fit around and engage with a wheel rim and to receive and hold a pneumatic tire, said band of angle pieces consisting of a series of plates bent or angled at each end in reverse directions, flexible connections to which said plates are attached, and an outer flexible casing or cover inclosing said plates and connections substantially as described.

In testimony whereof I have signed my name to this specification in the presence of two subscribing witnesses.

CHARLES WOOLLEY.

Witnesses:
EDMUND S. SNEWIN,
WM. V. BROWN.